(12) United States Patent
Srivatsan et al.

(10) Patent No.: US 8,444,330 B2
(45) Date of Patent: May 21, 2013

(54) IN-MAGAZINE IMAGING DEVICE ENCLOSURE

(75) Inventors: Vijay Srivatsan, Davis, CA (US); Zhe Jin, Sacramento, CA (US); Yadong Liu, Woodland, CA (US); Bingyan Zhao, West Sacramento, CA (US); Adam Hansel, Sacramento, CA (US); Hidenori Saraie, Davis, CA (US)

(73) Assignee: Mori Seiki Co., Ltd., Yamatokoriyama-shi (JP)

( * ) Notice: Subject to any disclaimer, the term of this patent is extended or adjusted under 35 U.S.C. 154(b) by 103 days.

(21) Appl. No.: 13/243,705

(22) Filed: Sep. 23, 2011

(65) Prior Publication Data

US 2012/0087647 A1    Apr. 12, 2012

Related U.S. Application Data

(60) Provisional application No. 61/391,377, filed on Oct. 8, 2010.

(51) Int. Cl.
*G03B 17/00* (2006.01)
*G03B 29/00* (2006.01)

(52) U.S. Cl.
USPC .......................................... 396/427; 396/429

(58) Field of Classification Search
USPC ................ 396/27, 427, 429; 359/507–509
See application file for complete search history.

(56) References Cited

U.S. PATENT DOCUMENTS

| 3,310,356 | A | * | 3/1967 | Borberg | 359/509 |
| 3,510,193 | A | * | 5/1970 | La Roche | 359/509 |
| 5,315,333 | A | * | 5/1994 | Nash | 396/448 |
| 2008/0285132 | A1 | * | 11/2008 | O'Kane | 359/509 |
| 2009/0207494 | A1 | * | 8/2009 | Gelbart et al. | 359/509 |
| 2012/0087647 | A1 | * | 4/2012 | Srivatsan et al. | 396/489 |

* cited by examiner

*Primary Examiner* — W B Perkey
(74) *Attorney, Agent, or Firm* — Oblon, Spivak, McClelland, Maier & Neustadt, L.L.P.

(57) ABSTRACT

An enclosure for an imaging device. In one embodiment, the enclosure includes a housing with a transparent window. A shutter mechanism is disposed on the housing and transparent window, and includes an opening formed therein. A shutter covers and uncovers the opening. Further, a gas supplying unit supplies gas to a space between the housing and the shutter mechanism. In another embodiment, the enclosure includes an inner housing with a transparent window, and an outer housing overlapping the inner housing and with an opening formed therein. A driving unit moves the opening along a predetermined path over the transparent window. A gas supplying unit supplies gas to the outer. In yet another embodiment, the enclosure includes inner and outer housings each having an opening formed therein. A rotating unit rotates one of the inner and outer housings, and a gas supplying unit supplies gas to the inner housing.

16 Claims, 24 Drawing Sheets

| Test Parameter | Value |
|---|---|
| T Commands | 200,000 |
| M6 Commands | 200,000 |
| Total shutter cycles | 400,000 |
| Total Duration | 24hrs, 17 days |
| Machine off time | 0 |
Fig. 18A
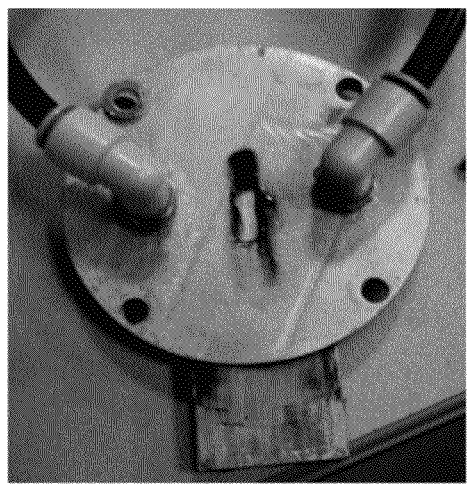
Fig. 18B
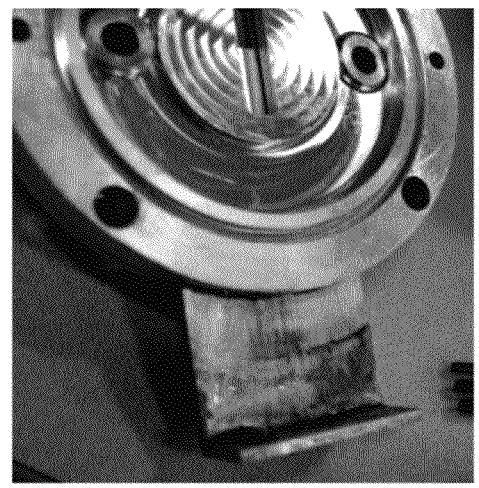
Fig. 18C

ROTATING SLIT

RECIPROCATING HOLE

IN-MAGAZINE IMAGING DEVICE ENCLOSURE

CROSS-REFERENCE TO RELATED APPLICATION

This application is related to and claims priority under 35 U.S.C. §119(e) to U.S. provisional patent application No. 61/391,377, filed Oct. 8, 2010, which is incorporated herein by reference in its entirety.

BACKGROUND OF THE INVENTION

1. Field of the Invention

The present invention relates generally to an enclosure for an imaging device. The present invention is more particularly related to an enclosure for protecting an imaging device (e.g., a camera) from contamination in a machining environment, while maintaining a clear view for the imaging device to capture images.

2. Description of the Related Art

There are several applications for charge-coupled (CCD) cameras in a machine tool environment. Some examples are co-simulation, machining monitoring, and vision tool monitoring (VTM). An exemplary VTM application is illustrated in FIG. 1. A CCD camera 2 is used in a magazine automatic tool changer (ATC) 4 area to automatically detect tool breakage when a tool returns to a magazine base 8 after completing an operation. Although the area around the magazine base 8 is not subject to the harsh conditions of a machining chamber, for example in which cutting of one or more materials is performed, it does occasionally get contaminants 10 splashing from the tool/spindle or the machining chamber during tool change operations. The contaminants 10 include, for example, coolant used in the machining chamber to cool a cutting area and reduce cutting haze and/or chips resulting from the cutting. The splashing can result from the ATC motion trajectory 12, which brings the tool from the machining chamber to an imaging position 6, as illustrated in FIG. 1.

Due to the possibility of contamination, commercially available CCD cameras cannot be used directly in the magazine base 8, since most do not have the required protection (e.g., an IP54 enclosure, in which IP refers to ingress protection, the first digit "5" indicates the level of protection that the enclosure provides against solid objects, and the second digit "4" indicates the level of protection that the enclosure provides against liquids) from the contaminants 10, and none have the ability to keep the CCD camera's lens clean should coolant/chip splashing occur.

Conventionally, the CCD camera is housed in an enclosure with a low diameter aperture and air purge to solve this problem. However, high resolution images, which require a high diameter aperture, are required in a machine tool environment. Use of the air purge in the conventional manner is not feasible in the machine tool environment for the following reasons. When the machine tool is turned off at night, there is no air supply and therefore any residual coolant or mist in a high humidity environment can enter the camera enclosure and deposit as dew or condensed oil mist on the CCD camera's lens. Further, due to the required high diameter aperture, the problem of coolant and oil mist entering the camera enclosure and condensing on the CCD camera's lens is accentuated.

Accordingly, this patent application presents methods and apparatuses that effectively maintain lens cleanliness and image clarity while protecting an imaging device, such as a CCD camera, in a harsh machining environment.

SUMMARY OF THE INVENTION

Accordingly, an object of the present invention is to provide an enclosure that protects an imaging device and maintains a clear view for the imaging device such that the imaging device can robustly and repeatedly acquire clear images.

According to an embodiment, there is provided an enclosure that includes a housing, a shutter mechanism, and a gas supplying unit. The housing is configured to house an imaging device and includes a transparent window. The shutter mechanism is disposed on the housing and the transparent window. Further, the shutter mechanism includes an opening formed therein and a shutter configured to cover the opening in a closed state and to uncover the opening to allow an image to be captured by the imaging device through the transparent window in an open state. The gas supplying unit is configured to supply gas to a space between the housing and the shutter mechanism such that gas is blown across the surface of the transparent window and purged out of the space through the opening when the shutter is in the open state.

Further, according to another embodiment, there is provided an enclosure including inner and outer housings, a driving unit, and a gas supplying unit. The inner housing is configured to house an imaging device, and includes a transparent window through which an image is captured by the imaging device. The outer housing overlaps the inner housing and has an opening formed therein. The driving unit is configured to move the opening along a predetermined path over the transparent window within a predetermined period of time, the predetermined period of time corresponds to a period of time required by the imaging device to capture the image through the transparent window. Further, the gas supplying unit is configured to supply gas into the outer housing such that the gas purges out of the outer housing through the opening.

According to another embodiment, there is provided an enclosure that includes an inner housing configured to house an imaging device and has a first opening through which an image is captured by the imaging device. An outer housing overlaps the inner housing and has a second opening through which the image is captured by the imaging device. Further, the enclosure includes a gas supplying unit that is configured to supply gas to the inner housing such that the gas purges out of the inner housing through the first and second openings when the first and second openings at least partially overlap. A rotating unit is configured to rotate one of the inner and outer housings to an open position at which time the first and second openings overlap, and to rotate the outer housing to a closed position at which time the first and second openings do not overlap

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 18A illustrates test parameters used to measure residue build up;

FIGS. 18B and 18C illustrate the build-up of residue on the exterior of exemplary enclosures;

DETAILED DESCRIPTION OF THE PREFERRED EMBODIMENTS

Figure 1:
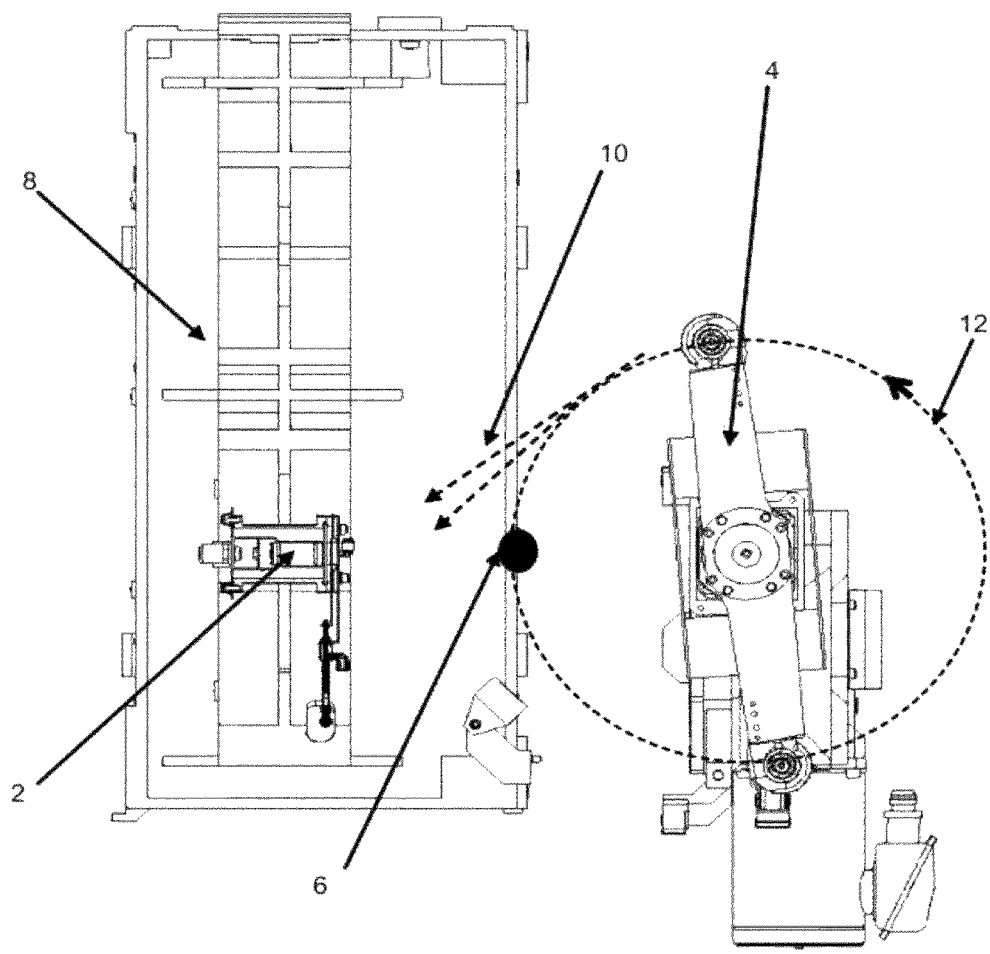
FIG. 1 illustrates an exemplary VTM application.
Figure 2A:
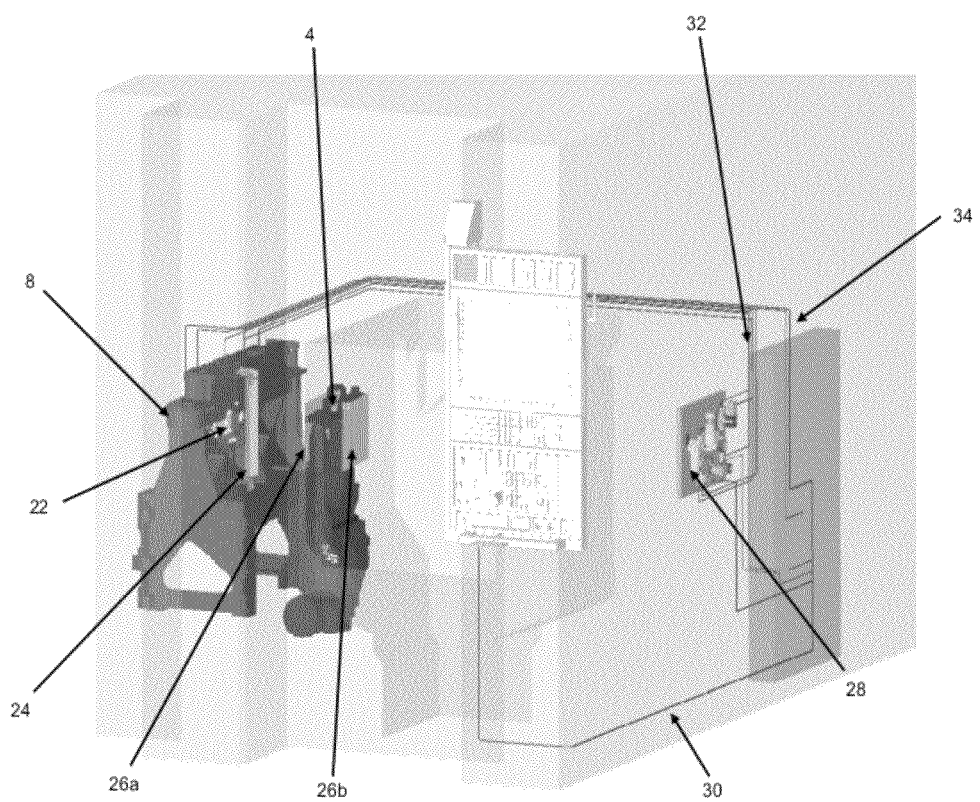
FIG. 2A illustrates an exemplary NMV-series machine in which VTM may be applied.

Referring now to the drawings, wherein like reference numerals designate identical or corresponding parts throughout the several views, FIG. 2A illustrates an exemplary VTM system incorporated into an NMV-series machine in the 5-axis machining center production line manufactured by Mori Seiki. As illustrated in FIG. 2A, an enclosure 22 is mounted in a magazine base 8. The enclosure 22 houses an imaging device such as a CCD camera. A light source 24, such as a light emitting diode (LED), is attached to the magazine base 8. Further, backlight plates 26a and 26b are attached to an arm of an ATC 4. The NMV-series machine also includes VTM pneumatic devices 28, universal serial bus (USB) cable 30 to a Mori Advanced Programming Production System (MAPPS) panel (e.g., the Mori Seiki MAPPS IV control panel), air hoses 32, electric signal and power cables 34, and a coolant tank (not shown).

Figure 2B:
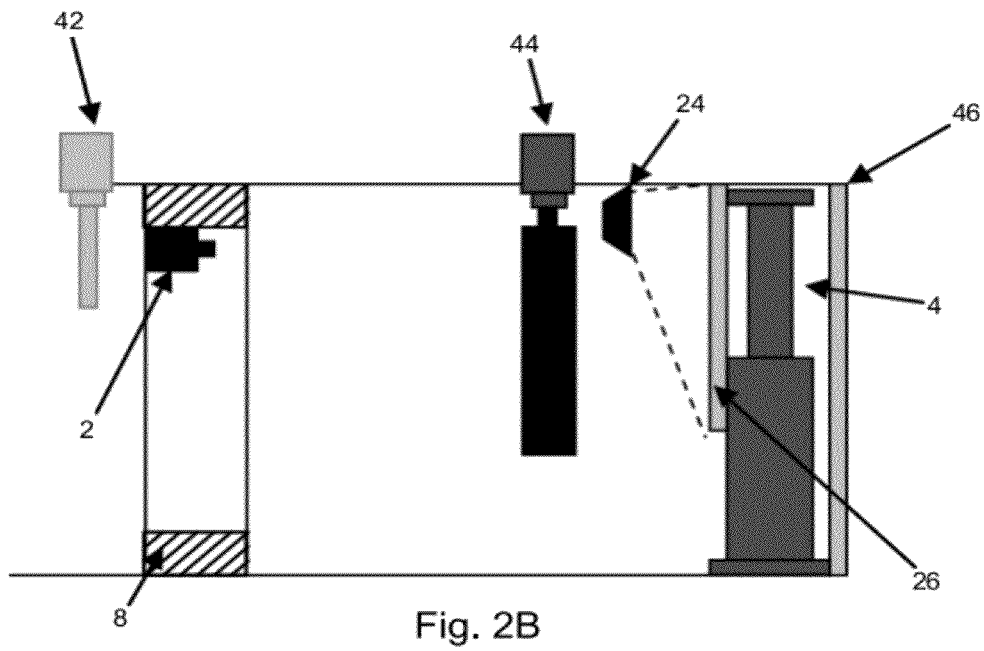
FIG. 2B illustrates an exemplary VTM system.
Figure 2C:
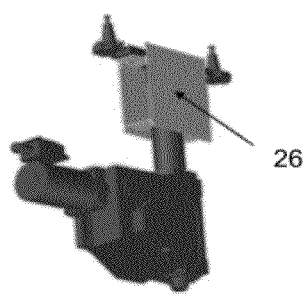
FIG. 2C illustrates an exemplary view of a backlight illumination plate.

FIG. 2B illustrates an exemplary VTM system for imaging a tool. Maintaining a clear field of view for an imaging device in the VTM system is important because the imaging device cannot be easily accessed for cleaning and/or replacement when mounted in a magazine base. A light source 24 projects light onto a backlight illumination plate 26. An imaging device 2 positioned in a magazine base 8, which stores tools such as a tool 42, captures an image of a tool 44 at a tool change position. The tool change is performed by an ATC 4, which includes an ATC shutter 46 for isolating the magazine area from a machining chamber. FIG. 2C is another exemplary view of the backlight illumination plate 26.

Figure 3A:
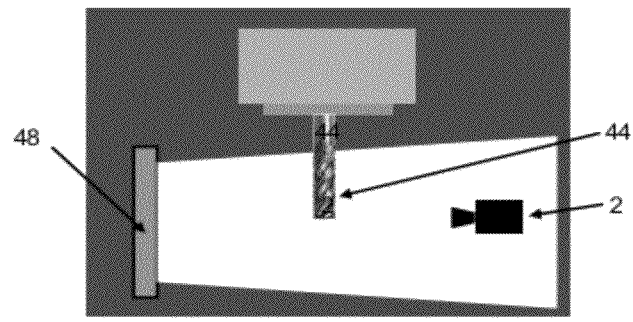
FIGS. 3A-3C illustrate the manner in which an image of a tool is captured by the VTM system of FIG. 2B.
Figure 3B:
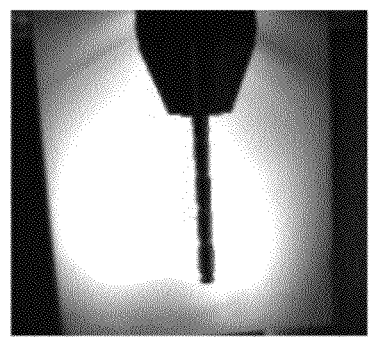
Figure 3C:
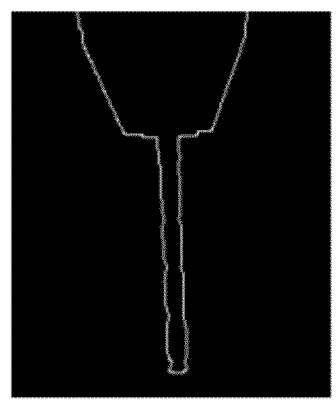

FIGS. 3A-3C illustrate the capturing of an image of the tool 44 in greater detail. As illustrated in FIG. 3A, a backlight 48 projects light toward the tool 44. The tool 44 is disposed between the backlight 48 and the imaging device 2. In one embodiment, the backlight 48 reflects light received from another light source such as the backlight illumination plate 26. In another embodiment, the backlight 48, itself, is the source of light.

FIG. 3B illustrates an exemplary view of the tool 44 as seen by the imaging device 2. A corresponding image of this view is captured by the imaging device 2, and converted, for example, into a black and white tool image, as illustrated in FIG. 3C, by image processing. The conversion may be performed by the imaging device 2 or by a separate conversion module. Alternatively, the imaging device 2 is configured to directly capture the black and white tool image of FIG. 3C.

The black and white tool image is used to identify any breakage in the tool 44. For example, as illustrated in FIG. 3C, the outline of the tool is represented in white such that any discontinuities in the outline of the tool 44 can easily be identified. However, the image of the tool may be captured with various other lighting conditions. Further, the image may be captured in color or grayscale.

In one embodiment, an enclosure formed by a housing that includes a transparent window, a shutter mechanism, and a gas supplying unit is used to protect an imaging device from contamination.

The transparent window is formed by one or a combination of glass, plastic such as polycarbonate, sapphire, diamond, or other transparent materials. In the event that there is a risk of one or more contaminants contacting the transparent window, the transparent window is preferably scratch resistant. The use of a scratch resistant window addresses the problem of possible scratching by contaminants, such as chips, that would obstruct the view of the imaging device. Further, an anti-scratch coating may be applied to the transparent window to enhance its ability to resist scratches. In one embodiment, the transparent window is formed of glass because it is easier to clean than plastic and found by the inventors to be more resistive to scratching than plastic. Further, other types of coating (e.g., an ionized coating as discussed below) may be applied to the transparent window to minimize contact with foreign particles such as water or coolant to make it easier to maintain a clear view or to facilitate cleaning the surface of the transparent window.

In one embodiment, the gas supplying unit includes one or more gas inlets that tap into an air supply line of a machining tool. Alternatively, or additionally, the gas supplying unit may supply air from an independent gas source. The type of gas supplied by the gas supplying unit is dependent on the type of environment to be monitored using the enclosure. For example, in a VTM system, air may be used since the use of air would not have a negative affect on the processing performed in the machining chamber.

Figure 4A:
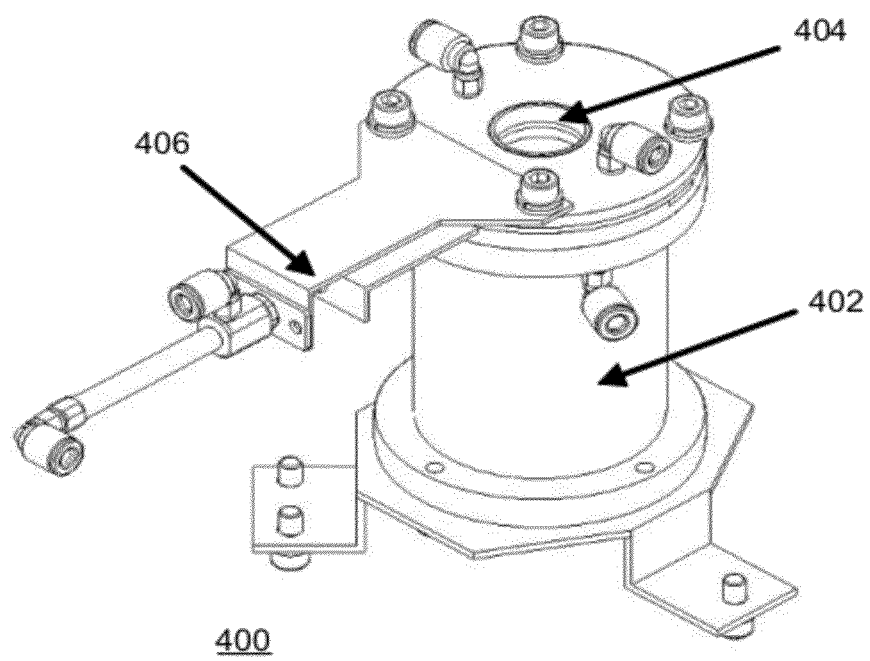
FIG. 4A illustrates an embodiment of an enclosure for an imaging device.

FIG. 4A illustrates an exemplary enclosure 400 in which a housing 402 with a transparent window 404 is configured to house the imaging device. The housing 402 is sealed to prevent entry of contaminants. In one embodiment, the housing 402 with the transparent window 404 is a completely enclosed and IP54 or higher, and more preferably IP67 or higher, sealed chamber with a glass window, or other transparent material. Further, a shutter 406 combined with a gas purge is used to prevent the transparent window 404 from being contaminated.

Figure 4B:
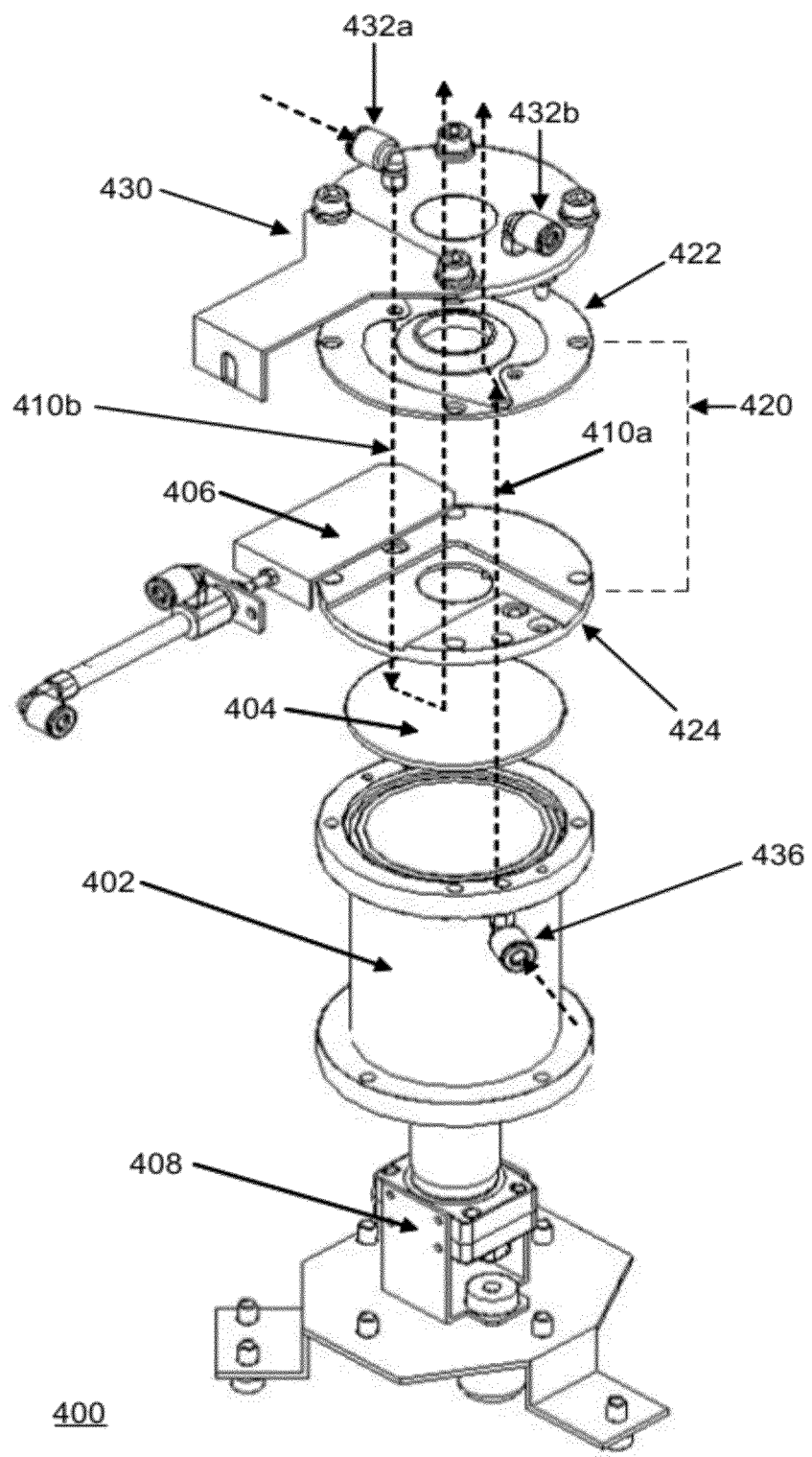
FIG. 4B is an exploded view of the enclosure illustrated in FIG. 4A.

FIG. 4B illustrates an exploded view of the enclosure 400. As illustrated in FIG. 4B, an imaging device 408 can be mounted in the housing 402. A shutter mechanism 420 is disposed on the housing 402 and the transparent window 404. In one embodiment, the shutter mechanism 420 includes an upper plate 422, a lower plate 424, and a shutter 406 disposed between the upper and lower plates 422, 424. An opening, or aperture, is formed in each of the upper and lower plates 422, 424. The upper and lower plates 422, 424 are aligned with the transparent window 404 and the optical path of the imaging device 408 in a manner such that the imaging device 408 is capable of capturing an image through the transparent window 404 and the opening formed by the apertures of the upper and lower plates 422, 424 when the shutter 406 is in the open state. In the closed state, the shutter 406 covers, and therefore seals off, the opening formed by the apertures of the upper and lower plates 422, 424 to protect the transparent window 404 from contamination. For example, when the shutter 406 is closed, it blocks the entry of coolant splashing from a tool during tool exchange operations or mist in the exchange area.

In one embodiment, a peripheral portion of the lower plate 424 is mounted on a peripheral portion of the housing 402 such that a space is formed between the lower plate 424 and the transparent window 404. The space is formed by mounting the transparent window 404 such that its upper surface is below the peripheral portion of the housing 402. This can be accomplished by disposing the transparent window 404 in a recessed portion of the housing 402 or by a spacer disposed between the housing 402 and the lower plate 424.

Further, the enclosure 400 includes a gas supply unit 430 for supplying one or more gases such as air. Reference numerals 410a and 410b illustrate gas flow in the enclosure 400 in one embodiment. As illustrated in FIG. 4B, the gas is supplied from the gas supply unit 430, which is disposed on the shutter mechanism 420. The gas supply unit 430 includes one or more gas intakes such as gas intakes 432a and 432b. Further, gas is optionally supplied via a gas intake 436 provided on the housing 402. In another embodiment, the gas is only supplied from one or more gas intakes provided on the housing 402.

As illustrated in FIG. 4B, the gas supply unit 430 and/or gas intake 436 supply one or more gases into the space between the transparent window 404 and the lower plate 424. When the shutter 406 is closed, one or more gases are supplied by the gas supply unit 430 and/or gas intake 436 such that a low volume of gas is provided in the space between the closed shutter 406 and the transparent window 404 to a maintain positive pressure in the space. The positive pressure blocks contaminants such as coolant mist from entering the space and condensing on the transparent window 404. When the imaging device 408 needs to acquire an image, for example, when a tool is in an imaging position, the shutter 406 is opened and the one or more gases are provided by the gas supply unit 430 and/or gas intake 436 such that a high volume of gas is blown across the surface of the transparent window 404 and/or purged through the opening in the shutter mechanism 420. The gas is blown across the surface of the transparent window 404 in order for the gas supply unit 430 and gas intake 436 to supply the gas from a position that does not obstruct the view of the imaging device. The high volume of gas prevents contaminants such as stray coolant or chips from contacting the transparent window 404, as illustrated in FIG. 5.

Figure 5:
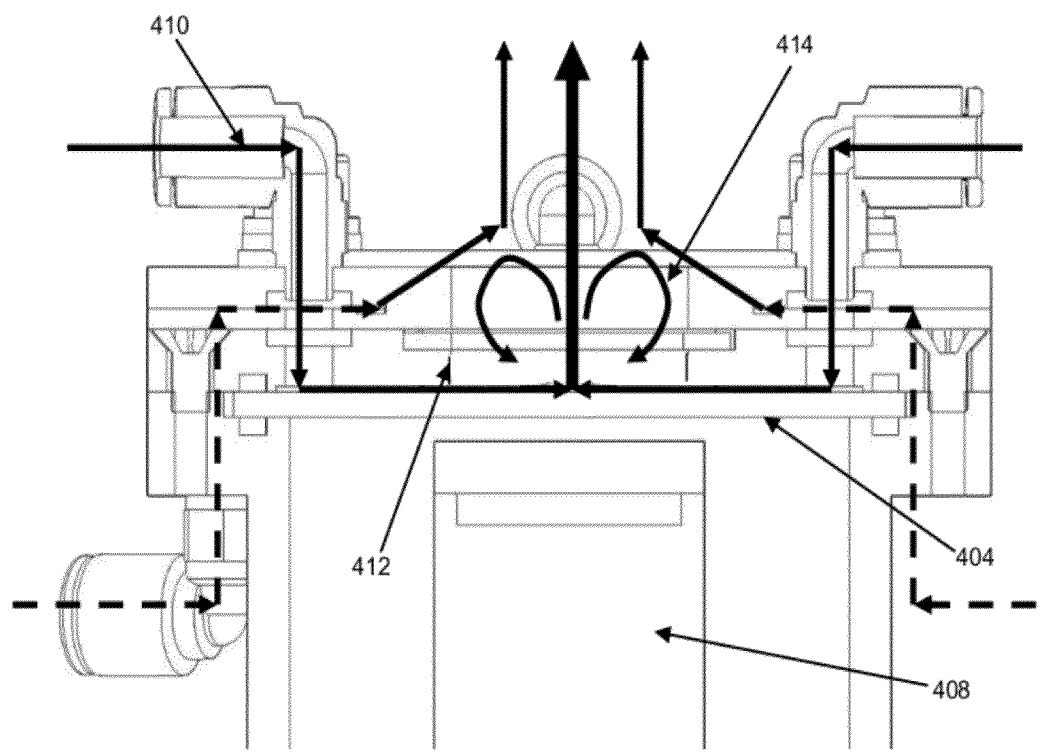
FIG. 5 illustrates the gas flow within and outside the enclosure illustrated in FIG. 4A.
Figure 6A:
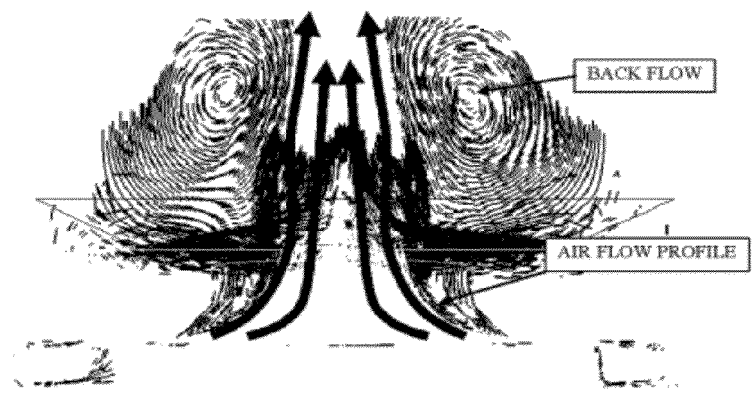
FIGS. 6A and 6B illustrate a Computational Fluid Dynamics (CFD) analysis of the gas flow for the enclosure illustrated in FIG. 4A.
Figure 6B:
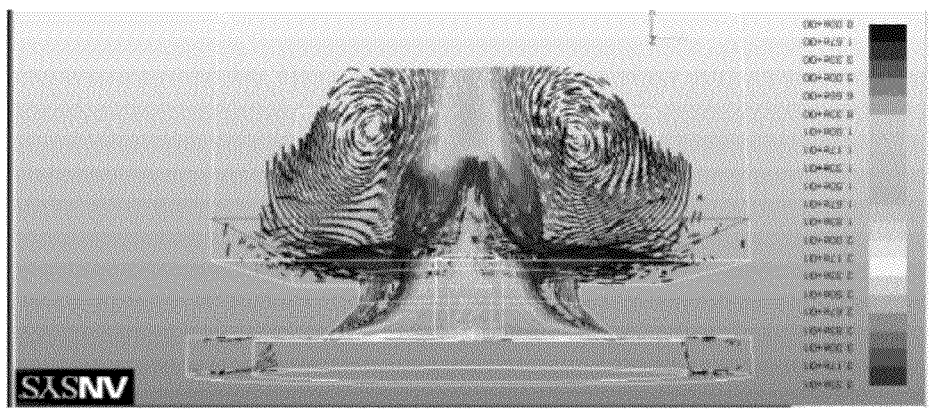
Figure 7:
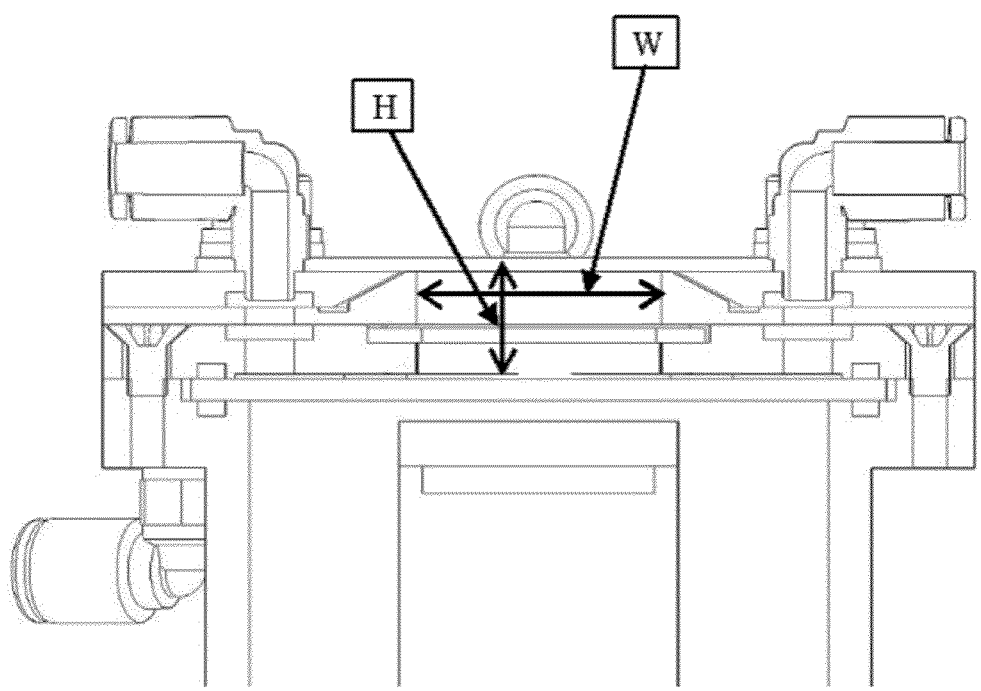
FIG. 7 illustrates the area to height ratio of an aperture of the enclosure in FIG. 4A.

However, as illustrated in FIG. 5, the inventors discovered that a backflow of gas 414 is created at the exit of an opening 412 when the shutter 406 is in the open state. This backflow problem was analyzed using Computational Fluid Dynamics (CFD), as illustrated in FIGS. 6A and 6B. Due to the geometry of the opening 412, which contains a large area (W) and a small thickness (H), as illustrated in FIG. 7, there is a backflow of gas at the exit of the opening 412 due to the large W/H ratio. This backflow sucks in contaminants such as coolant mist and deposits it on the transparent window 404 within a very short period of time. This essentially worsens the situation.

Figure 8A:
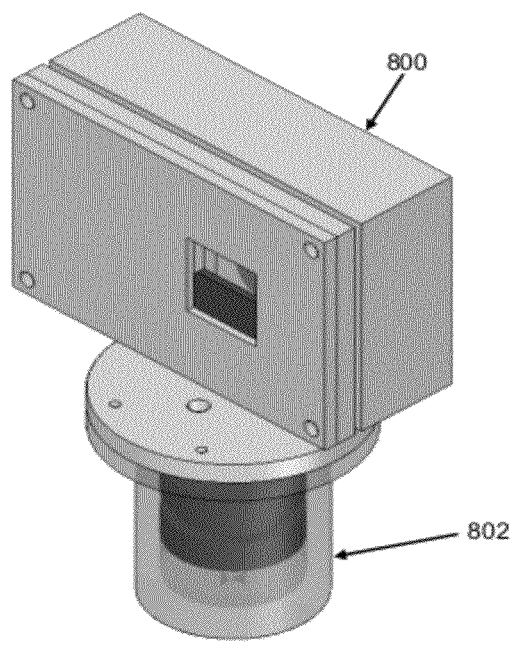
FIGS. 8A and 8B illustrate another embodiment of an enclosure for an imaging device.
Figure 8B:
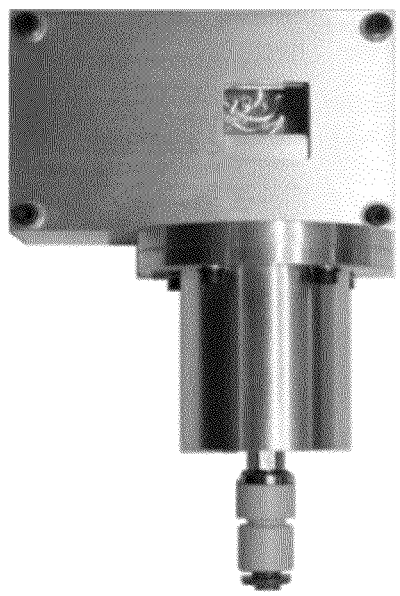
Figure 9:
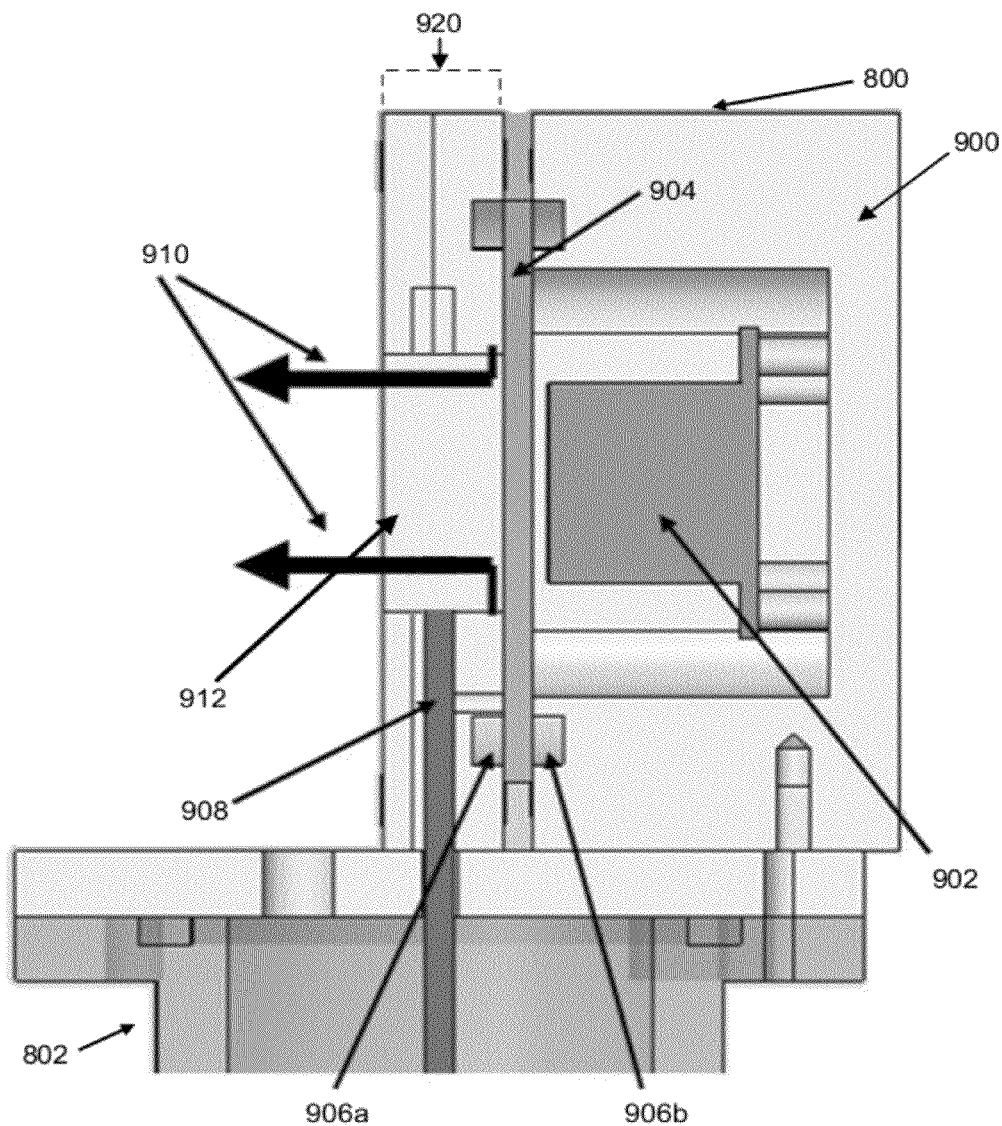
FIG. 9 illustrates a cross-section of the enclosure in FIGS. 8A and 8B.

FIGS. 8A and 8B illustrate another enclosure embodiment. An enclosure 800 is connected to an air cylinder 802, which supplies one or more gases, such as air, into the enclosure 800. As illustrated in FIG. 9, the enclosure 800 is configured to house an imaging device 902. The imaging device 902 is disposed behind a transparent window 904. The transparent window 904 is disposed between a shutter mechanism 920 and a housing body 900. O-rings 906a and 906b are placed between the transparent window 904 and each of the shutter mechanism 920 and housing body 900 to prevent contaminants from entering the housing body 900 or an opening 912 in the shutter mechanism 920. Similar to the embodiment of FIGS. 4A and 4B, when a shutter 908 is opened to allow the imaging device 902 to capture an image, gas purges out of a space between the shutter mechanism 920 and the transparent window 904, as indicated by reference numeral 910. Further, gas is supplied into the space such that there exists a positive pressure in the space when the shutter 908 is closed.

Figure 10A:
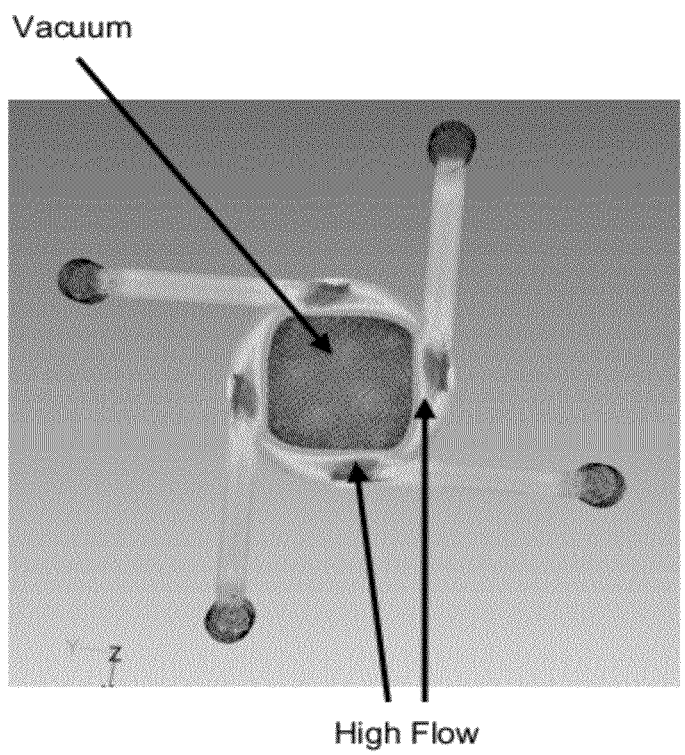
FIGS. 10A and 10B illustrate CFD analyses of the gas flow for the enclosure illustrated in FIGS. 8A and 8B.
Figure 10B:
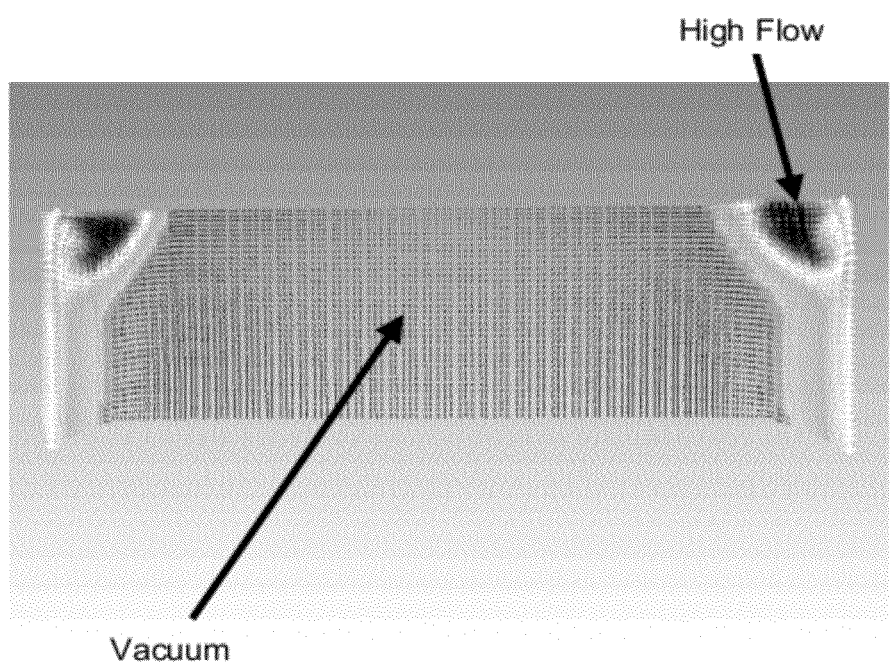

FIGS. 10A and 10B illustrate an example of the backflow created when gas is purged out of the opening created when the shutter 908 is open. A vacuum is created that draws contaminants toward the transparent window 904.

Accordingly, this patent application presents several embodiments to further address this backflow problem, thereby providing a complete solution to protect an imaging device and robustly and repeatably acquire clear images through, for example, a lens and window, that is constantly clean. Although the embodiments are discussed separately, it should be noted that elements of the different embodiments can be combined to further reduce the possibility of contamination.

Figure 11A:
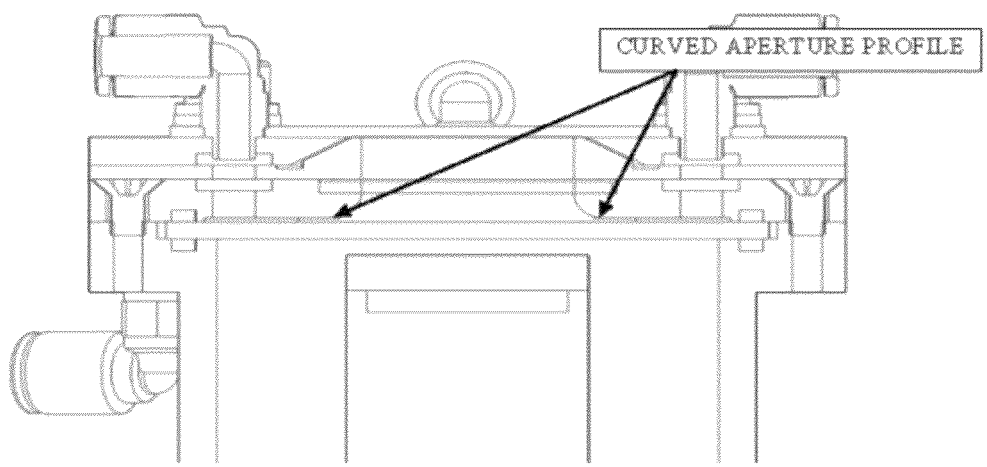
FIGS. 11A and 11B illustrate an exemplary curved aperture cross-section.
Figure 11B:
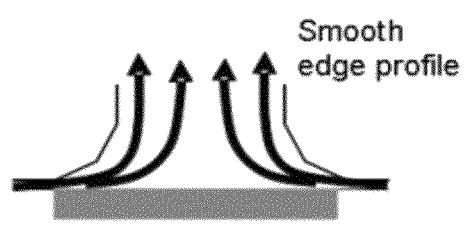

In one embodiment, the same enclosure concepts illustrated, for example, in FIGS. 4A, 4B, 8A, 8B, and 9 are used. However, the geometry of the opening, or aperture, in the shutter mechanism is changed to ensure uniform air flow over the entire area of the opening and to ensure that there is no backflow when the shutter is open and gas flows out through the opening. Specifically, a curved aperture cross-section is used as shown, for example, in FIGS. 11A and 11B. The aperture profile is designed to match the gas flow profile for a specific shutter mechanism opening, for example using a CFD analysis similar to FIG. 6A, 6B, 10A, or 10B. This ensures that there is uniform laminar flow exiting the opening over the entire area of the opening and eliminates backflow of gas.

Figure 12:
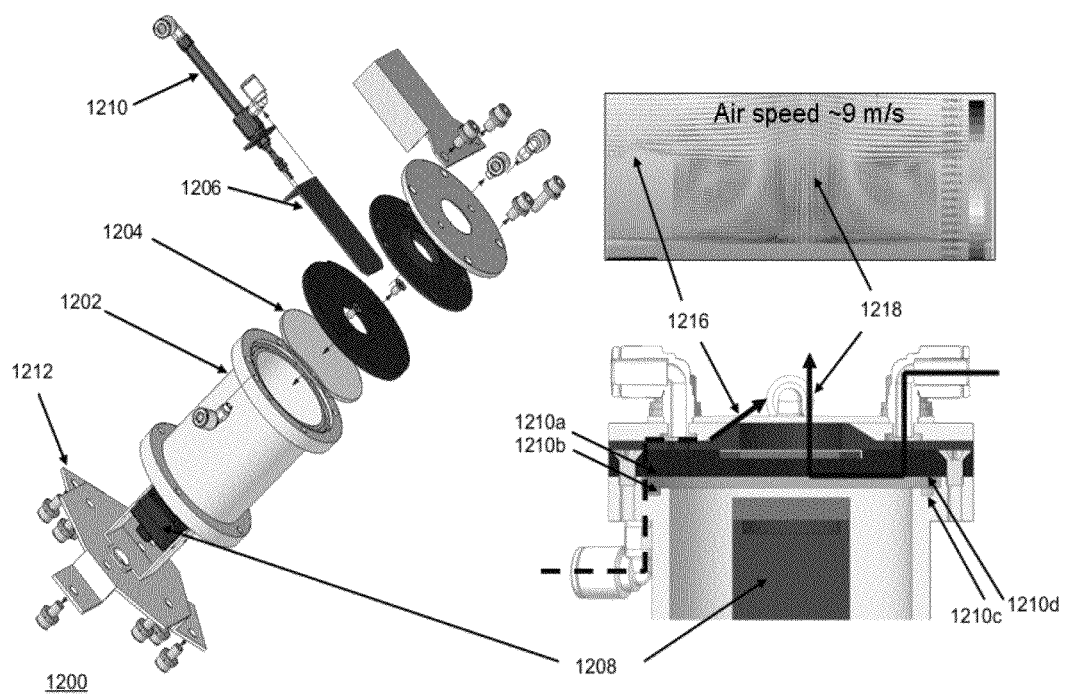
FIG. 12 illustrates another embodiment of an enclosure for an imaging device.

FIG. 12 illustrates an exemplary enclosure 1200 that utilizes a gas curtain 1216 and gas purge 1218. The enclosure 1200 optionally includes a curved cross-section geometry aperture to further eliminate the backflow of gas. The enclosure 1200 includes a housing 1202, a transparent window 1204, a shutter 1206, an air cylinder 1210 for positioning the shutter 1210 in the open and closed states, and an imaging device mounting bracket 1212 for mounting an imaging device 1208. The enclosure 1200 further includes o-rings 1210a-1210d. When the shutter 1206 is in the open state, gas is supplied such that the gas curtain 1216 and the gas purge 1218 are created. The gas curtain 1216 and the gas purge 1218 prevent contamination of the transparent window 1204.

Figure 13:
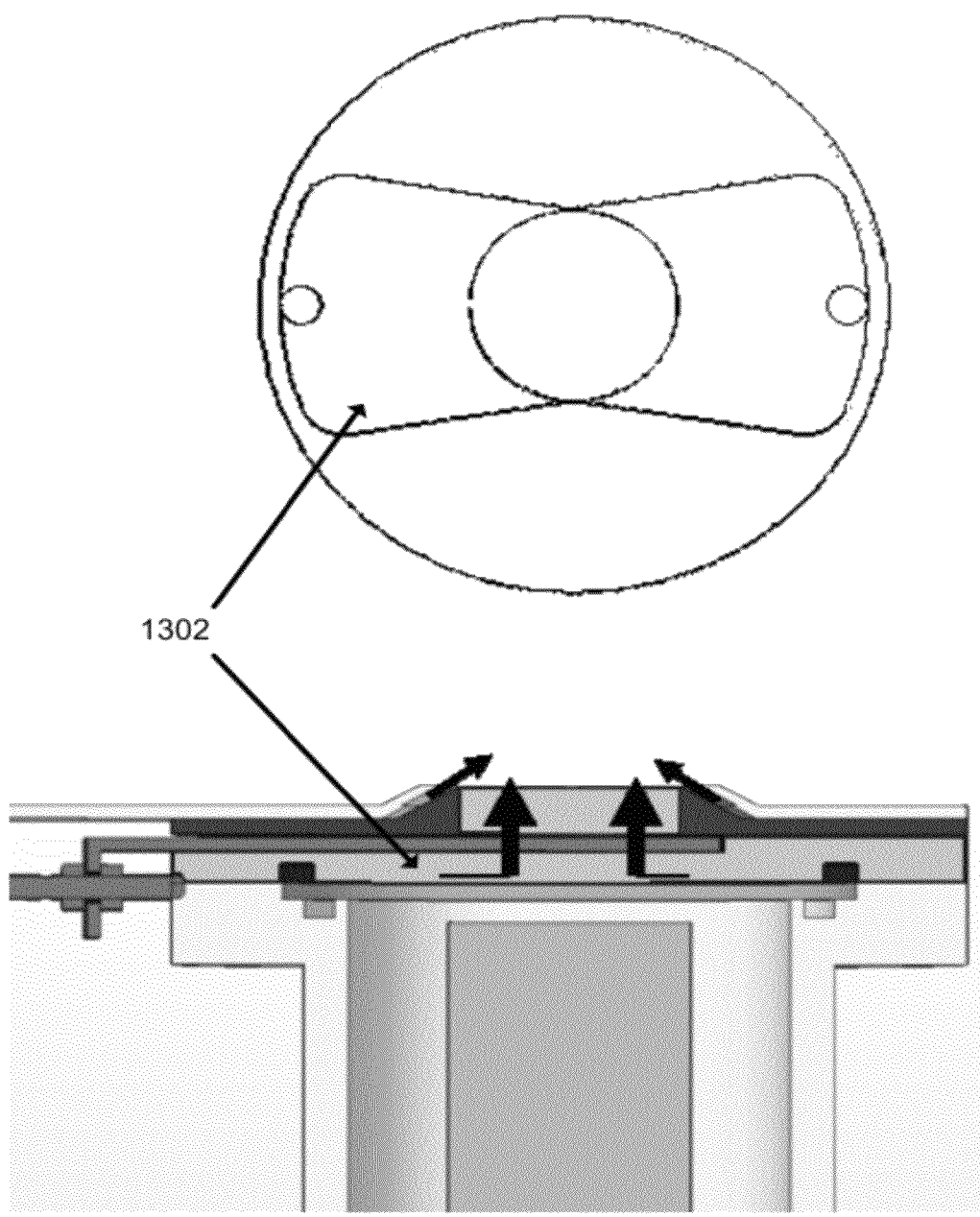
FIG. 13 illustrates the gas flow channels of the enclosure in FIG. 12.
Figure 14A:
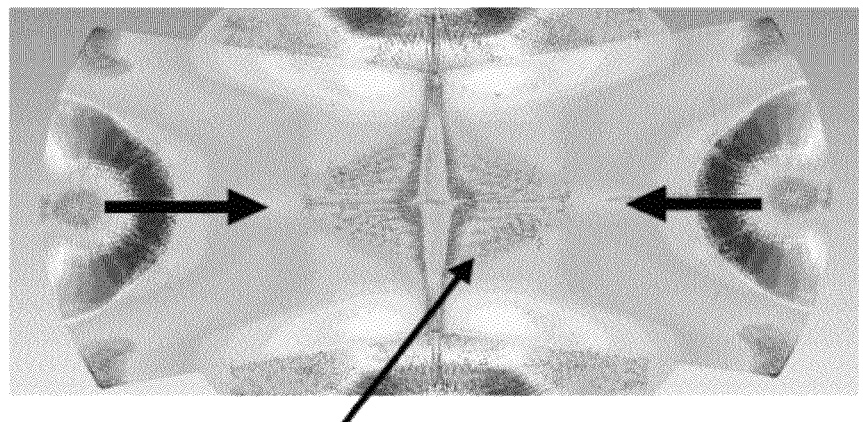
FIGS. 14A and 14B illustrate CFD analyses of the gas flow of the enclosure illustrated in FIG. 12.
Figure 14B:
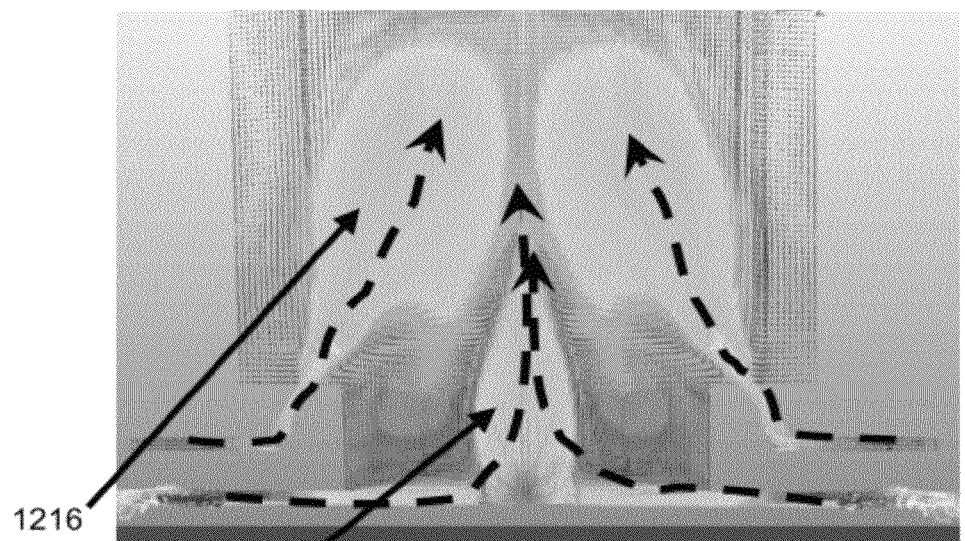

FIG. 13 illustrates an embodiment of the gas flow channels of the enclosure 1200. Further, FIGS. 14A and 14B illustrate an exemplary corresponding CFD analysis of the gas flow. In particular, the arrow in FIG. 14A identifies a good gas flow, and the arrows in FIG. 14B point to the gas curtain 1216 and gas purge 1218.

In another embodiment, a slit-type aperture is used instead of a circular aperture. This embodiment uses a similar enclosure concept as shown, for example, in FIGS. 4A, 4B, 8A, 8B, 9, and 12. A slit-type aperture is justified when an object to be imaged is long a thin, such as a cutting tool. As a result, a full image from the imaging device is not necessary. Only the object and the surrounding background needs to be imaged.

Figure 15:
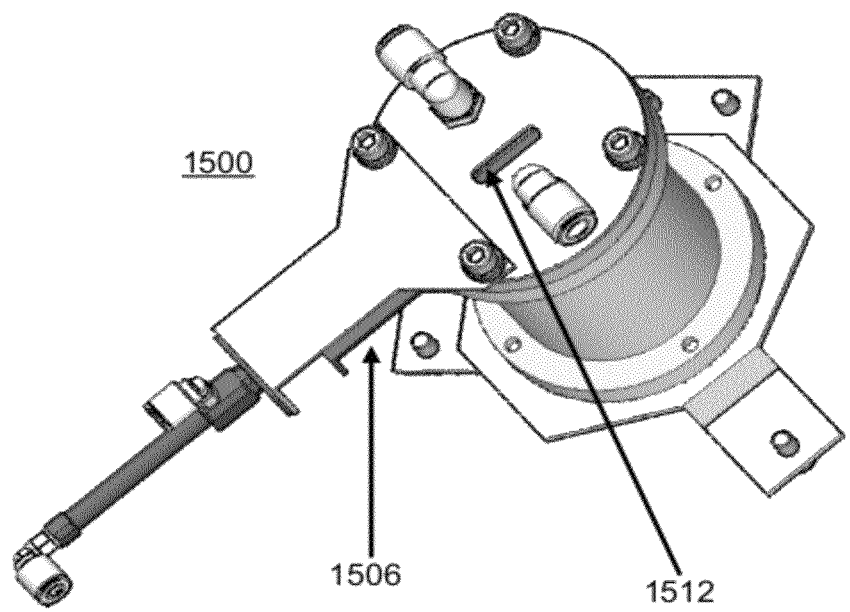
FIG. 15 illustrates another embodiment of an enclosure for an imaging device.
Figure 16:
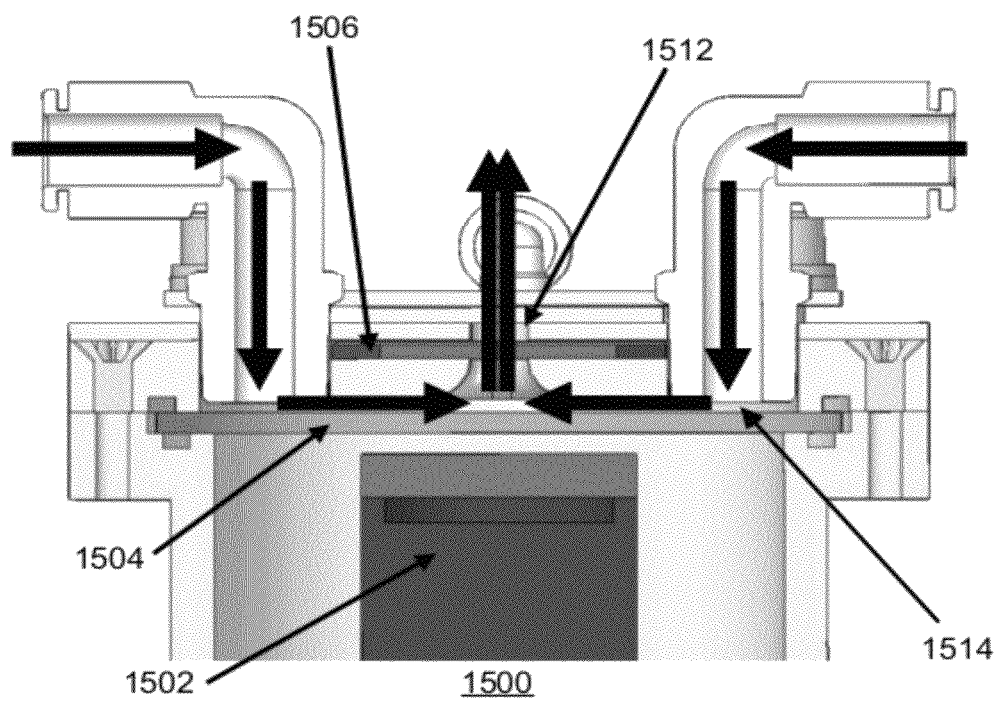
FIG. 16 illustrates a cross-sectional view of, and the flow of gases within, the enclosure in FIG. 15.

FIG. 15 illustrates an exemplary enclosure 1500 according to this embodiment. The enclosure 1500 includes a slit-type aperture 1512 and a shutter 1506 configured to cover and uncover the aperture 1512 to seal off a space 1514. Further, FIG. 16 is a cross-sectional view of the enclosure 1500. As illustrated in FIG. 16, an imaging device 1502 is disposed inside the enclosure 1500 and behind a transparent window 1504. The space 1514 is formed in the enclosure 1500 above the transparent window 1504. Gas is supplied to the space 1514 and purged through the slit-type aperture 1512 when the shutter 1506 is in the open state. Further, gas is supplied to maintain a positive pressure in the space 514 when the shutter 1506 is in the closed state, as discussed above.

Figure 17:
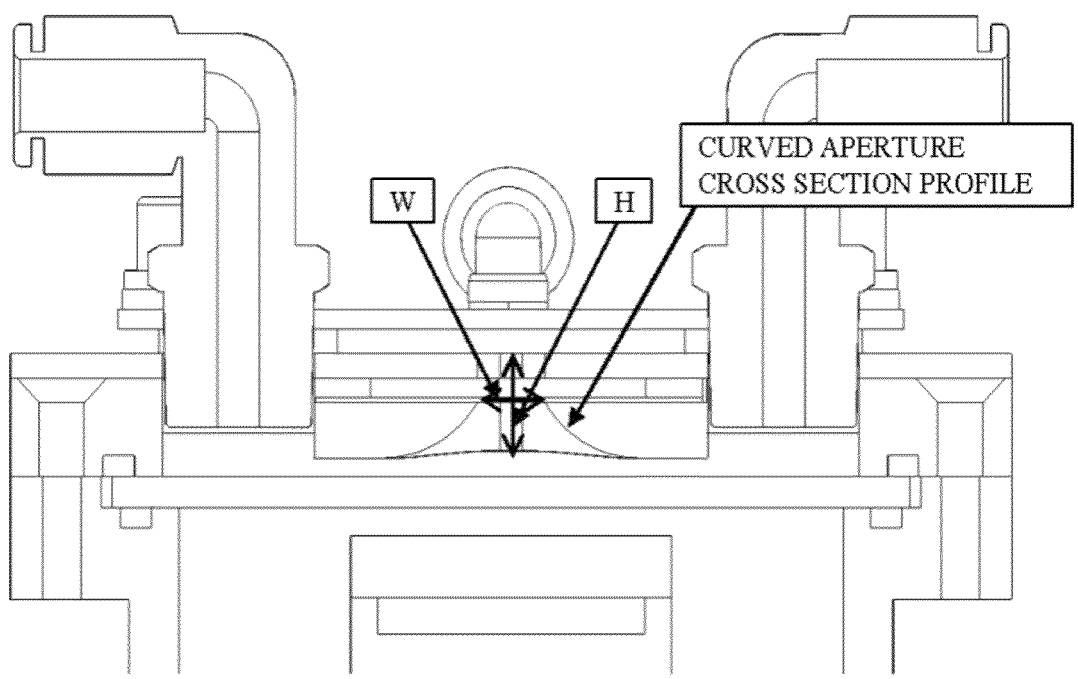
FIG. 17 is a more detailed illustration of the aperture in the enclosure of FIG. 15.

Therefore, the area of the aperture (W) can be reduced while maintaining an aperture thickness (H) as shown in FIG. 17. The smaller W/H ratio reduces the back flow of the design shown in FIG. 5. Further, the shutter 1506 is configured to close the slit-type aperture 512 when the camera is not in use. Moreover, the curved cross-section geometry illustrated in FIG. 17 can optionally be used to help maintain a uniform laminar flow across the slit-type aperture 1512. Another advantage to this embodiment is that the volume of air flow required is far less than required for a larger aperture, such as the circular aperture discussed above, since the area of the aperture is significantly reduced.

FIG. 18A illustrates test parameters which were used to determine the amount of residue buildup on the exterior of an enclosure in which a slit aperture is formed. The T command is a command that a controller uses to call a specific tool to a tool change position. For example, the command T2 causes tool #2 to move to the tool change position to prepare for a subsequent tool change. The M6 command is a command that the controller uses to trigger a tool change action. After the M6 command is executed, the tool at the tool change position will be exchanged for the tool on the spindle of a machine tool. Accordingly, one tool change process includes one T command and one M6 command. Further, for each tool change process, a shutter that isolates the magazine area from a machining chamber opens once and closes once while a shutter of the camera enclosure opens and closes twice to capture images of the new tool to be used and the returning tool from the spindle. Using the captured images, the new tool is measured to make sure that it is suitable for use and the returning tool is measured to determine its condition (e.g., whether it is suitable for further use) after the machining operation. 200,000 tool change occurrences and 400,000 shutter open/close cycles are shown in FIG. 8A.

The amount of residue build-up on the exterior of the enclosure after being subjected to these testing parameters is illustrated in FIGS. 18B and 18C. As illustrated in FIGS. 18B and 18C, the enclosure is exposed to a significant amount of contamination in just a short amount of time.

In another embodiment, a high speed rotating or reciprocating shutter is used to further reduce the physical area of the aperture used by an imaging device to capture an image. This reduction can be accomplished without reducing the field of view of the imaging device. In this embodiment, the rotation/reciprocating speed of the shutter is set to be higher than the time necessary for the imaging device to capture an image (e.g., camera shutter speed). Therefore, a small physical aperture with uniform air flow can be used to generate a large aperture for image capture.

In one embodiment, in order to maintain a full view, a high speed rotating slit is used. The speed of rotation of the rotating slit is made to be faster than the time necessary for the imaging device to capture an image. For example, when the imaging device is a camera, the speed is set to be faster than the shutter speed used by the camera to capture the image. Specifically, the speed of rotation is set such that the slit is moved along a predetermined path such that light for the entire full view is exposed to the camera at least once within a predetermined time corresponding to the amount of time the shutter for the camera is open to capture an image. For example, when the length of the slit is equal to the diameter of an opening to be formed by rotating the slit, the slit is rotated at least 180° during the predetermined time. When the length of the slit is equal to the radius of the opening to be formed by rotating the slit, the slit is rotated at least 360° during the predetermined time. This allows the imaging device mounted in the enclosure to utilize the full view to capture the image while the physical aperture is reduced. Further, a resultant spiraling gas flow out of the rotating slit aperture is even more effective at keeping contaminants at bay.

Figure 19A:
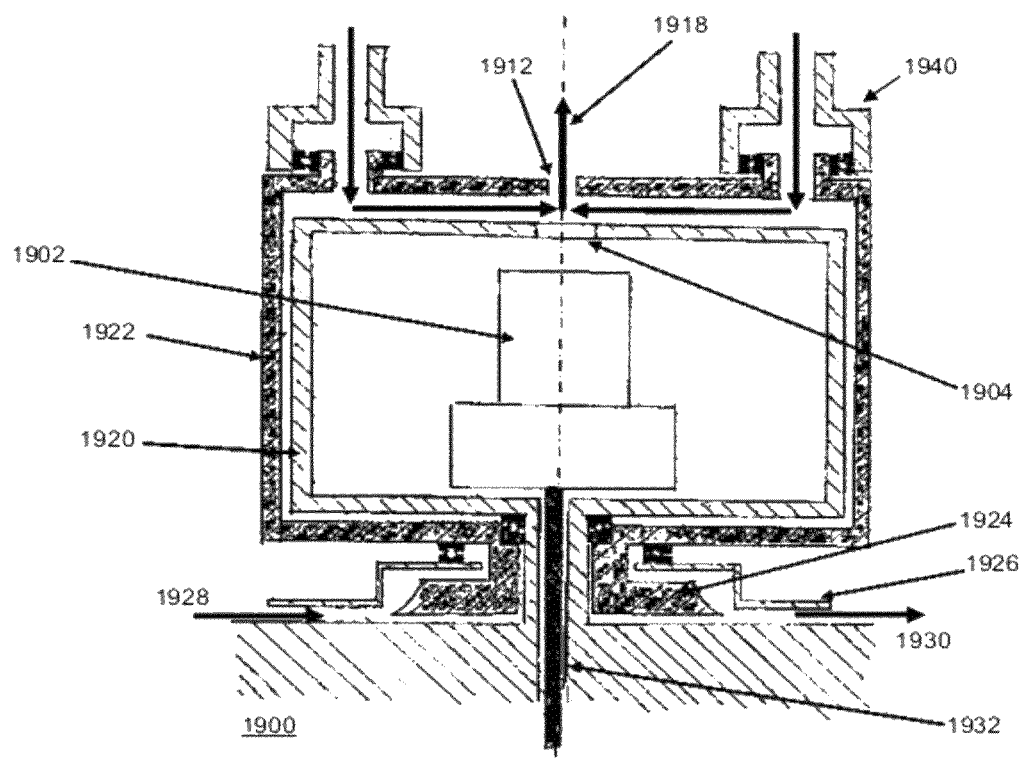
FIG. 19A illustrates another embodiment of an enclosure for an imaging device.

FIG. 19A illustrates an embodiment of an enclosure 1900 with a high speed rotating opening in the form of a slit 1912. The enclosure 1900 is formed of two overlapping housings, an inner cylindrical housing 1920 and an outer cylindrical housing 1922. However, in other embodiments, the overlapping housings may be in other shapes such as a cone or the like. Alternatively, one of the overlapping housings may be a disc or other flat shape.

In one embodiment, the inner cylindrical housing 1920 is stationary and houses an imaging device 1902. However, in other embodiments, the inner cylindrical housing 1920 is configured to rotate within the outer cylindrical enclosure 1922, in the same or opposite direction as the outer cylindrical housing 1922 or while the outer cylindrical housing 1922 is stationary. The inner cylindrical enclosure 1920 has a first opening formed therein through which the imaging device 1902 captures an image. A transparent window 1904 is disposed in the first opening of the inner cylindrical housing 1920. As discussed above, the transparent window 1904 may be a glass window.

Further, an outer cylindrical housing 1922 overlaps the inner cylindrical housing 1920 such that the inner cylindrical housing 1920 is disposed within the outer cylindrical housing 1922. The outer cylindrical housing 1922 includes a second opening formed therein such as a slit-type aperture 1912. In one embodiment, the enclosure 1900 further includes a shutter (not shown) that is configured to cover the slit-type aperture 1912. The transparent window 1904 and slit-type aperture 1912 are aligned with the optical path of the imaging device 1902 such that the imaging device 1902 can capture images through the transparent window 1904 and slit-type aperture 1912.

The entire outer cylindrical housing 1922 is rotated by means of driving unit such as a small motor or an air turbine 1924. In one embodiment, a turbine air inlet 1928 and turbine air outlet 1932 are used to supply air to drive the air turbine 1924. Further, gas is input into the space between the inner and outer cylindrical housings 1920, 1922 through a stationary ring 1940. In one embodiment, the ring is kept stationary with respect to the rotating outer cylindrical housing 1922 using bearings.

Figure 20A:
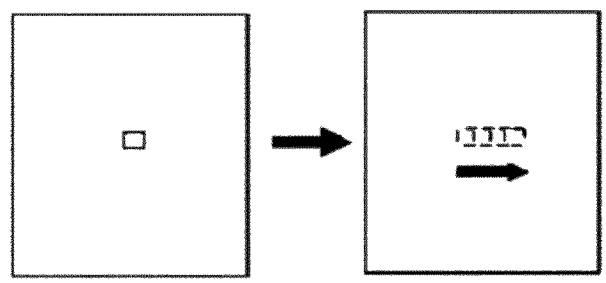
FIG. 20A illustrates an exemplary aperture created by another enclosure embodiment.
Figure 20B:
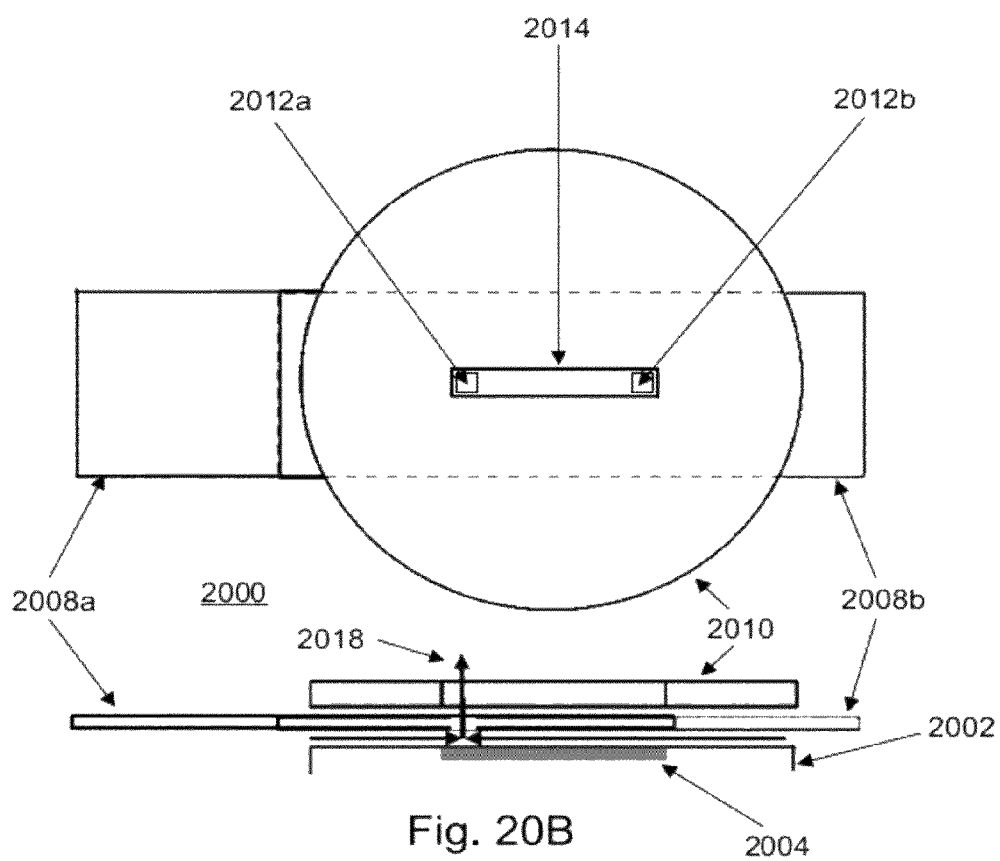
FIG. 20B illustrates an enclosure embodiment that is configured to create the aperture illustrated in FIG. 20A.

In another embodiment, a reciprocating shutter is used to create an opening for an imaging device to capture an image. For example, a slit-type aperture is created by using a reciprocating hole on a shutter, as illustrated in FIG. 20A. As illustrated in FIG. 20B, the reciprocating motion of a shutter 2008 causes it to move back and forth between an initial position indicated by reference numeral 2008*a* and a final position indicated by the reference numeral 2008*b*. This reciprocating motion causes a reciprocating hole 2012 to travel between an initial position indicated by reference number 2012*a* and final position indicated by reference numeral 2012*b*. The shutter 2008 is reciprocated such that the reciprocating hole 2012 travels along a predetermined path along a slit 2014 formed in the cover 2010 over the transparent window 2004 and housing 2002. When not in use, in one embodiment, the reciprocating hole 2012 is moved to a position under the cover 2010 such that the reciprocating hole 2012 and the slit 2014 do not overlap.

Figure 19B:
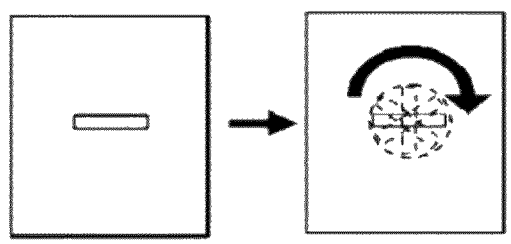
FIG. 19B illustrates an exemplary aperture created by the enclosure of FIG. 19A.

Accordingly, a similar concept as that described above with respect to FIGS. 19A and 19B is used. That is, a shutter contains a hole that reciprocates to create a slit-type aperture while further reducing the required gas flow and area to height ratio, as illustrated in FIG. 20B. However, in one embodiment, this design requires a high speed reciprocating air cylinder that can be expensive and increase gas consumption, especially when the gas is being redirected from the machine. Therefore, this design is more suitable in extreme situations such as where there is very high humidity or constant splashing of coolant on the camera or when gas consumption is not an issue.

To reduce gas consumption, in another embodiment, the reciprocating shutter 2008 is replaced with a disc or other flat shape having a plurality of holes disposed therein. The holes are disposed in such a manner that rotating the disc or other flat shape results in the different holes overlapping with different positions of the slit 2014. Therefore, a slit-type aperture can be created by rotating the disc or the other flat shape.

In yet another embodiment, an enclosure including inner and outer housings is used to house an imaging device and protect the imaging device from contamination. The outer housing covers at least a portion of the inner housing and each of the inner and outer housings includes an aperture formed therein. For an open position, the inner and/or outer housings is/are rotated to a position such that the two apertures overlap and create an opening for the imaging device to acquire an image. For the closed position, the inner and/or outer housings is/are rotated to a position such that the two apertures do not overlap.

Figures 21A, 21B, 21C:
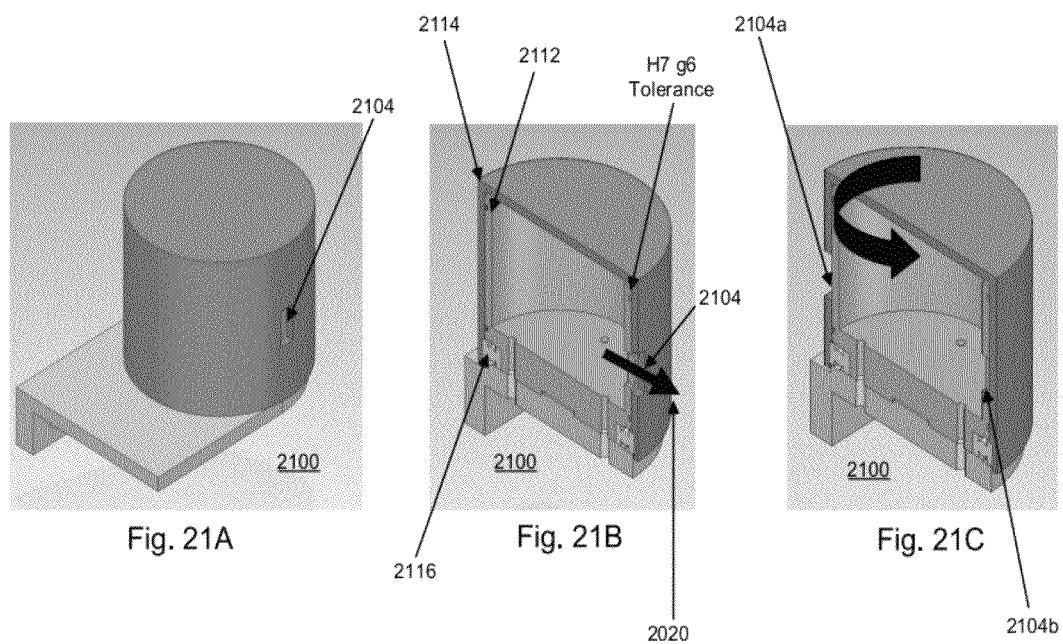
FIG. 21A illustrates another embodiment of an enclosure for an imaging device.
FIG. 21B illustrates the enclosure of FIG. 21A in an open position.
FIG. 21C illustrates the enclosure of FIG. 21A in a closed position.

FIGS. 21A-21C illustrate an embodiment in which an enclosure 2100 includes an opening 2104. When an imaging device such as a camera is housed in the enclosure 2100, the imaging device is positioned such that the optical path of the imaging device is aligned with the opening 2104. This alignment allows the imaging device to capture one or more images through the opening 2104.

The enclosure 2100 includes an inner housing 2112 and an outer housing 2114, which overlaps the inner housing 2112. As illustrated in FIG. 21B, the inner and outer housings 2112, 2114 are cylindrical. The inner housing 2112 includes a first opening 2104*a* and the outer housing 2114 includes a second opening 2104*b* formed in their respective surfaces. Although the first and second openings 2104*a*, 21024 are illustrated as slit-shaped apertures, other shapes can be used for the first and second openings based on the field of view requirements of a camera to be housed in the enclosure 2100.

Additionally, in other embodiments, the inner and outer housings can be formed in other shapes as long as the outer housing covers at least a portion of the inner housing. For example, the inner and outer housings can be formed in other circular shapes such as a cone, sphere, hemisphere, or the like. Further, additional housings can be added to further reduce the risk of contaminating the imaging device. For example, a third housing having a third opening and that rotates around the outer housing 2106, may be added in another embodiment.

FIGS. 21B and 21C illustrate the enclosure 2100 in an open position and a closed position, respectively. The enclosure 2100 is placed in the open position and the closed position by rotating the outer housing 2114. In this embodiment, the inner housing 2112 remains stationary while the outer housing 2114 serves as a shutter. The outer housing 2114 is supported on a support 2116 that allows the outer housing 2114 to rotate around the inner housing 2112. The support 2116 may include one or more ball bearings, a low friction surface, a slide rail, a thread formed on the surface of the inner housing 2112, or the like that allows the outer housing 2114 to rotate around the inner housing 2112. In other embodiments, the outer housing 2114 is stationary while the inner housing 2112 rotates inside the outer housing 2114, or the inner housing 2112 and outer housing 2114 rotate concurrently. For example, the inner and outer housings 2112, 2114 may be configured to rotate in opposite directions to shorten the time required to switch between the open and closed positions. In another embodiment, an imaging device may be rotated in addition to rotating both the inner and outer housings 2112, 2114 to increase the field of view available for image capture.

As illustrated in FIG. 21B, the enclosure 2100 is placed in the open position when the outer housing 2114 is rotated such that the first and second openings 2104*a*, 2104*b* are aligned with each other. A positive pressure is maintained in the inner housing 2112 such that, when the first and second openings 2104*a*, 2104*b* are aligned to form the opening 2104, a gas within the inner housing 2112 is purged out of the opening 2104, as indicated by arrow 2020.

In FIG. 21C, the enclosure 2100 is placed in the closed position by rotating the outer housing 2114 such that the first and second openings 2104*a*, 2104*b* no longer overlap. As illustrated in FIG. 21C, the outer housing 2114 is rotated such that the first and second openings 2104*a*, 2104*b* are 180° out of phase, to reduce the chance of contaminants entering the inner housing 2112. However, the outer housing 2114 can be moved to any other position as long as the first and second openings 2104*a*, 2104*b* do not overlap. For example, in another embodiment, the outer housing 2114 is moved vertically to a position where the first and second openings 2104a, 2104b do not overlap.

When the first and second openings 2104a, 2104b do not overlap, a seal formed by the surfaces of the inner and outer housings 2112, 2114 prevent contaminants from entering the inner housing 2112. This seal is created because the diameters of the inner and outer housings 2112, 2114 are set to be very close to each other. The contaminants are prevented from entering the inner housing 2112 because the spacing between the inner and outer housings 2112, 2114 are configured with a tight tolerance (e.g., an H7 G6 tolerance or greater, according to ISO 286, which is incorporated herein by reference in its entirety) such that the contact between the surfaces of the inner and outer housing 2104, 2106 is sufficient to prevent contaminants from entering therebetween. In another embodiment, one or more seals are disposed in areas between the inner and outer housings 2112, 2114. For example, seals may be placed around the first opening 2104a and/or second opening 2104b. Alternatively, seals may be placed in all areas between the inner and outer housings 2112, 2114.

Figure 22A:
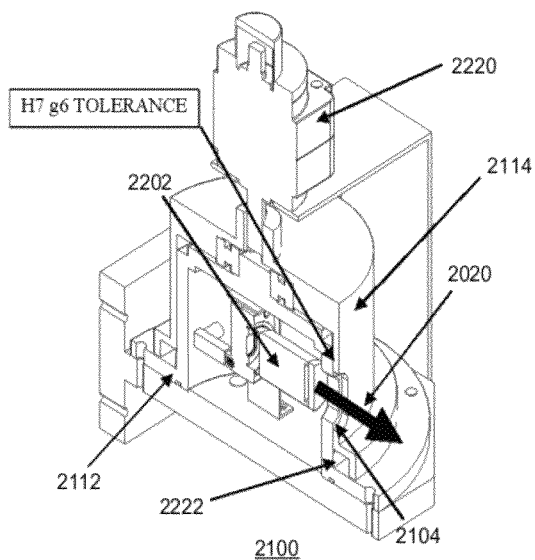
FIGS. 22A and 22B are more detailed illustrations of the enclosure of FIG. 21B in the open position.
Figure 22B:
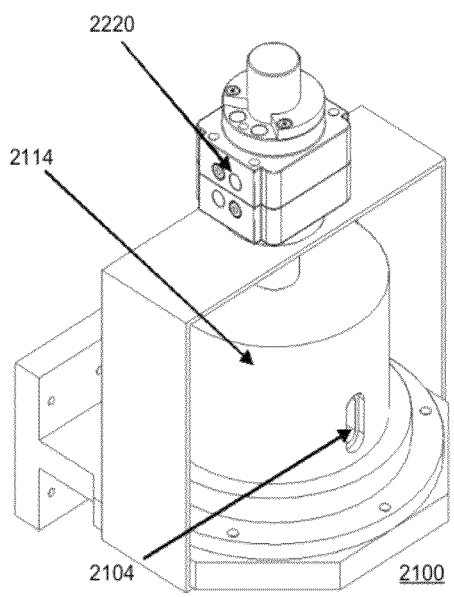
Figure 23A:
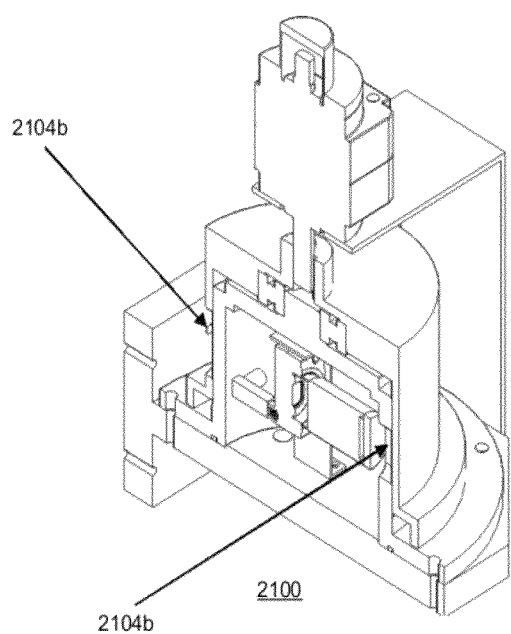
FIGS. 23A and 23B are more detailed illustrations of the enclosure of FIG. 21C in the closed position.
Figure 23B:
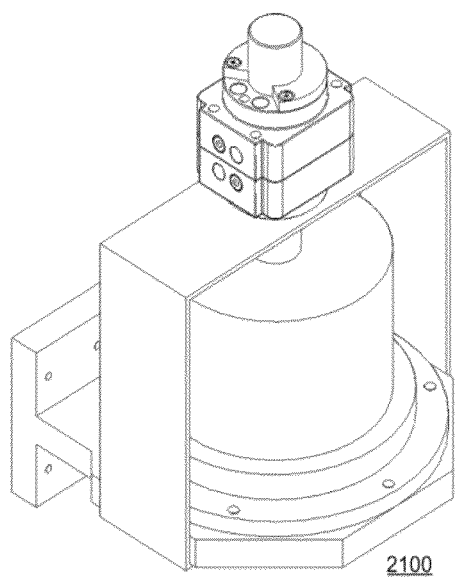

FIGS. 22A, 22B, 23A, and 23B illustrate the enclosure 2100 in greater detail. In FIGS. 22A and 22B, the enclosure 2100 is in the open position. While in the open position, a gas purge from inside the enclosure 2100 is used to prevent contaminants such as coolant/chips from entering through the opening formed by the overlapping first and second openings 2104a and 2104b.

An imaging device 2202 is housed in the inner housing 2112. The imaging device 2202 is positioned in the inner housing 2112 such that the optical path of the imaging device 2202 is aligned with the first opening 2104a. A rotating unit 2220, which serves as a shutter actuator, rotates the outer housing 2114 to place the enclosure 2100 in the open or closed state. Further, an optional seal 2222 is disposed between the inner and outer housings 2112, 2114 to further prevent contaminants from entering the inner housing 2112.

As noted above, in the closed position, the outer housing 2114 is rotated such that the first and second openings 2104a, 2104b do not overlap by, for example, rotating the outer housing 2114 such that the first and second openings 2104a, 2104b are 180° out of phase. In one embodiment, the outer aperture faces away from the source of contamination to further minimize the chance of the contaminants entering the inner housing 2112. For example, the outer aperture faces away from the coolant to make the chance of coolant entry or mist entry into the enclosure impossible. Also, due to the above-discussed tight tolerance between the inner and outer housings 2112, 2114, and the use of seals as shown in FIG. 22A, mist cannot enter the inner housing 2112 when the gas is turned off.

In a further embodiment, the pressure inside the enclosure 2100 is set to be higher than the pressure outside the enclosure 2100, in the closed position, to further prevent the possible entry of contaminants.

The above-described enclosure embodiments robustly keep an imaging device sealed from contaminants such as coolant, chips and, coolant mist, and humidity. While sealing the imaging device, these embodiments also effectively keep the imaging device's view clean, therefore enabling the acquisition of high resolution, high clarity images even in a harsh environment. Further, the embodiments described above minimize gas consumption, such as air, while maintaining a good seal and cleanliness in different environments and situations.

As noted above, various embodiments of an enclosure for housing an imaging device may be provided to protect the imaging device from contaminants while allowing the imaging device to capture clear images. In one embodiment, the geometry of a circular aperture in a shutter mechanism is changed to ensure uniform air flow over the entire area of the circular aperture. In another embodiment, a slit-type aperture is used rather than a circular aperture. Use of the slit-type aperture is justified when an object (e.g., a cutting tool) to be imaged is long and thin. Further, in another embodiment, a high speed rotating or reciprocating shutter is used. The rotation/reciprocating speed of the shutter is set to be higher than the time required for the imaging device to capture the image (e.g., a camera's shutter speed). Therefore, a small physical aperture with a uniform gas flow can be used to generate a larger aperture for image capture. In yet another embodiment, an enclosure with inner and outer housings is used to house the imaging device. The outer housing covers at least a portion of the inner housing. Further, each of the inner and outer housings includes an aperture formed therein. In an open position, the inner and/or outer housings is/are rotated to a position at which the two apertures overlap and create an opening for the imaging device to capture an image. In the closed position, the inner and/or outer housings is/are rotated to a position at which the two apertures do not overlap.

Numerous modifications and variations of the present invention are possible in light of the above teachings. It is therefore to be understood that within the scope of the appended claims, the invention may be practiced otherwise than as specifically described herein.

For example, a cleaning mechanism may be implemented in any of the above embodiments to clean the transparent window, such as glass window, or a lens on the imaging device, in the event of contamination. The transparent window or lens may be cleaned using a high pressure air/coolant mixture. This would allow reuse of the machine coolant. Alternatively, the cleaning may be performed based on CCD data.

Further, in another example, an auxiliary power supply and/or gas supply may be used in conjunction with any of the above embodiments, to maintain a positive pressure in the enclosure. The auxiliary power supply and/or gas supply addresses the problem of maintaining a positive pressure within the enclosure when a machine is turned off. For example, when a tooling machine is off, additional gas cannot be supplied to the enclosure even when the internal pressure drops due to leakage in, for example, one or more seals. The auxiliary power supply allows additional gas to be provided into the enclosure to prevent such a drop in pressure. Further, the auxiliary gas supply decreases the effect of the presence of any leaks by, for example, slowing down the rate the internal pressure drops.

In a further example, coolant used in the machine may be ionized and an ionized coating applied to the transparent windows described above to further prevent contaminants from forming on the transparent windows.

Moreover, the embodiments described above are applicable in other environments besides a machine tool environment. Other applicable environments include co-simulation in a machining chamber in which the camera is placed near the door of the machining chamber such that it can be easily cleaned by the operator, within a machining chamber for cutting material in which coolant is applied to the cutting area to reduce cutting haze, machine monitoring in which a camera may be placed in any location and easily accessed for cleaning, other machine tool environments, robotic assembly lines in which an imaging device is attached to a robotic arm, etc.

The invention claimed is:

1. An enclosure, comprising:
   a housing configured to house an imaging device and including a transparent window;
   a shutter mechanism disposed on the housing and the transparent window, the shutter mechanism including an opening formed therein and a shutter configured to cover the opening in a closed state and to uncover the opening and allow an image to be captured by the imaging device through the transparent window in an open state; and
   a gas supplying unit configured to supply gas to a space between the housing and the shutter mechanism such that the gas is blown across the surface of the transparent window and purged out of the space through the opening when the shutter is in the open state.

2. The enclosure according to claim 1, wherein
   a positive pressure is maintained in the space between the shutter mechanism and the transparent window when the shutter is in the closed state.

3. The enclosure according to claim 1, wherein
   the opening included in the shutter mechanism is a circular aperture having a curved cross-section geometry.

4. The enclosure according to claim 1, wherein
   the opening included in the shutter mechanism is a slit-shaped aperture.

5. The enclosure according to claim 4, wherein
   the slit-shaped aperture has a curved cross-section geometry.

6. An enclosure, comprising:
   an inner housing configured to house an imaging device, and including a transparent window through which an image is captured by the imaging device;
   an outer housing overlapping the inner housing and having an opening formed therein; and
   a driving unit configured to move the opening along a predetermined path over the transparent window within a predetermined period of time, the predetermined period of time corresponding to a period of time required by the imaging device to capture the image through the transparent window; and
   a gas supplying unit configured to supply gas into the outer housing such that the gas purges out of the outer housing through the opening.

7. The enclosure according to claim 6, wherein
   the inner and outer housings are cylindrically- or conically-shaped.

8. The enclosure according to claim 7, wherein
   the opening formed in the outer housing is slit-shaped; and
   the driving unit is configured to rotate the outer housing around the inner housing body at least 180° within the period of time required by the imaging device to capture the image.

9. The enclosure according to claim 8, wherein
   the gas supplying unit is ring-shaped, and the enclosure further comprises
   bearings configured to keep the gas supplying unit stationary when the outer housing rotates.

10. The enclosure according to claim 7, wherein
    the driving unit is configured to reciprocate the opening over the transparent window to create a slit.

11. An enclosure, comprising:
    an inner housing configured to house an imaging device, and having a first opening through which an image is captured by the imaging device;
    an outer housing overlapping the inner housing, and having a second opening through which the image is captured by the imaging device;
    a gas supplying unit configured to supply gas to the inner housing such that the gas purges out of the inner housing through the first and second openings when the first and second openings at least partially overlap; and
    a rotating unit configured to rotate one of the inner and outer housings, wherein
    the rotating unit is configured to rotate the one of the inner and outer housings to an open position at which time the first and second openings overlap, and to rotate the outer housing to a closed position at which time the first and second openings do not overlap.

12. The enclosure according to claim 11, wherein
    the inner and outer housings are cylindrically- or conically-shaped.

13. The enclosure according to claim 11, wherein
    the first and second openings are slit-shaped.

14. The enclosure according to claim 11, wherein
    the first and second openings are the same size.

15. The enclosure according to claim 11, further comprising:
    a seal disposed between the inner and outer housings.

16. The enclosure according to claim 11, wherein
    in the closed position, the rotating unit is configured to rotate the one of the inner and outer housings such that the first and second openings are 180° out of phase.

* * * * *